United States Patent
Copeland

(10) Patent No.: US 9,387,868 B2
(45) Date of Patent: Jul. 12, 2016

(54) SKI PORTER

(71) Applicant: Anthony Trevor Copeland, Chicago, IL (US)

(72) Inventor: Anthony Trevor Copeland, Chicago, IL (US)

( * ) Notice: Subject to any disclaimer, the term of this patent is extended or adjusted under 35 U.S.C. 154(b) by 0 days.

(21) Appl. No.: 14/578,058

(22) Filed: Dec. 19, 2014

(65) Prior Publication Data

US 2015/0191188 A1    Jul. 9, 2015

Related U.S. Application Data

(60) Provisional application No. 61/924,849, filed on Jan. 8, 2014.

(51) Int. Cl.
*B62B 1/00*    (2006.01)
*B62B 1/26*    (2006.01)
*A63C 11/02*   (2006.01)

(52) U.S. Cl.
CPC .............. *B62B 1/262* (2013.01); *A63C 11/026* (2013.01)

(58) Field of Classification Search
CPC ..... B62B 1/262; A63C 11/026; A63C 11/023
USPC ............. 280/47.26, 47.24, 47.19, 35, 47.131, 280/40, 204
See application file for complete search history.

(56) References Cited

U.S. PATENT DOCUMENTS

| | | | | |
|---|---|---|---|---|
| 4,268,050 A | * | 5/1981 | Kennedy, Sr. ............. | B60R 9/12 280/47.19 |
| 5,207,441 A | * | 5/1993 | Granbery ............ | B63B 35/7946 280/204 |
| 6,070,906 A | * | 6/2000 | Allen .................... | A63C 11/026 280/47.19 |
| 6,848,718 B2 | * | 2/2005 | Ravikumar .......... | A63C 11/023 280/35 |
| 7,243,928 B2 | * | 7/2007 | Singer ...................... | B62B 1/26 280/40 |
| 7,490,858 B1 | * | 2/2009 | Sellers ................. | A63C 11/026 280/47.26 |
| 7,798,528 B2 | * | 9/2010 | Sellers ................. | A63C 11/026 280/47.26 |
| 8,360,474 B2 | * | 1/2013 | Lurie .................... | A63C 11/026 280/47.26 |
| 8,556,296 B2 | * | 10/2013 | Allen ................... | A63C 11/026 280/47.131 |
| 8,690,167 B1 | * | 4/2014 | Huntley ................ | B26B 5/0083 280/414.2 |

* cited by examiner

*Primary Examiner* — Hau Phan
(74) *Attorney, Agent, or Firm* — Chen-Chi Lin

(57) ABSTRACT

The Ski Porter provides a convenient and practical way for snow skiers to transport their skis, boots and poles when they are not skiing. The Ski Porter attaches using the boot binding and utilizes two (2) wheels for easy transport.

6 Claims, 2 Drawing Sheets

SKI PORTER

BACKGROUND OF THE INVENTION

Skis are heavy and burdensome to control when not in use. Their long length makes them awkward to manipulate. Plus two (2) poles are normally involved. The distance walked can be quite significant as one is rarely able to find parking close to the chair lift. Accordingly, there exists a need for a device that can easily allow a skier to transport skis, boots and poles from the car to the base area.

BRIEF SUMMARY OF THE INVENTION

The Ski Porter is comprised of a collapsible frame including a mount connected to 2 legs by a hinged shoulder. Each leg has a wheel attached at the ankle.

The Ski Porter connects to the ski using the boot binding for a secure attachment. The Ski Porter allows the skier to easily roll their equipment instead of carrying it from their vehicle to the ski area and vice versa. A release lever will allow the Ski Porter to collapse making shuttle bus riding easy and convenient.

The Ski Porter is small enough to fit in most lockers available at the ski area while skiers are skiing. An additional option is for skiers to use a simple cable lock to secure the Ski Porter to any post during the ski day rather than a locker.

BRIEF DESCRIPTION OF DRAWINGS

The accompanying drawings illustrate the invention. In such drawings.

DETAILED DESCRIPTION OF THE INVENTION

Figure 1:
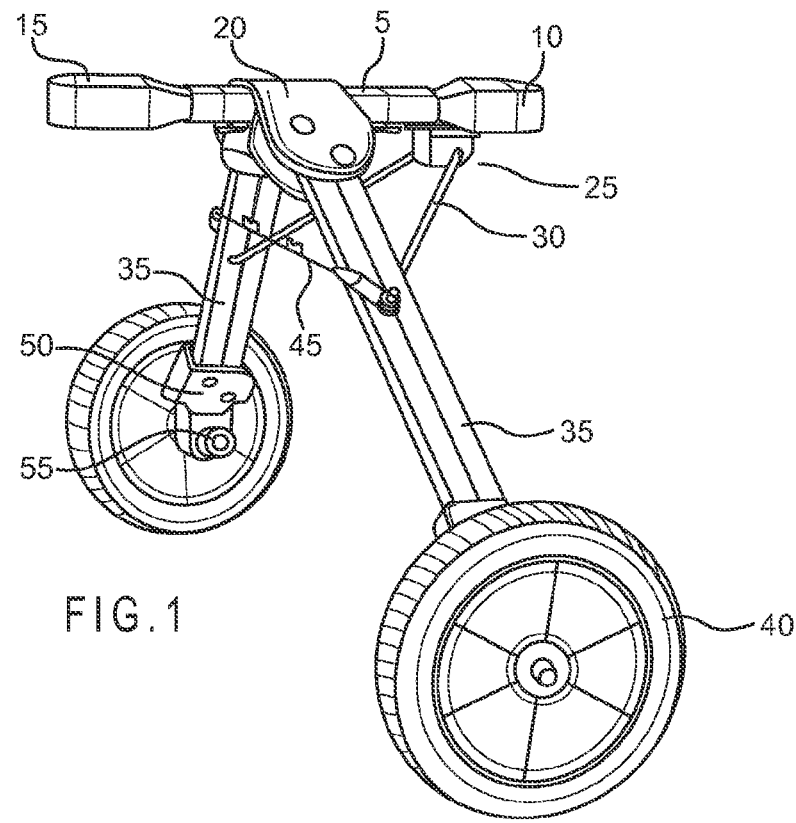
FIG. 1 is a perspective view of an exemplary embodiment of a Ski Porter in its open position.

As shown in the drawings for purposes of illustration, the present invention for a Ski Porter is referred to generally by the reference number (100). FIG. 1 is a perspective view of Ski Porter (100). It is comprised of an adjustable mount (5) which will fit many binding settings. The toe (10) is made of plastic and is shaped like a ski boot toe. The heel (15) is made of plastic and shaped like a ski boot heel. The shoulder (20) is made of plastic and acts as a hinge between the mount (5) and the aluminum legs (35). Each leg (35) is made of 2 lengths of square tubing hinged at the shoulder (20) and the ankle (50). A flexible support (45) is connected to both legs (35) providing lateral and vertical support. The flexible support (45) has molded rubber tabs that hold ski poles near the baskets. The rigid support (30) is connected to each leg (35) and the toe (10). A release lever (25) is used at the toe (10). A release lever (25) is used at the toe (10) to disconnect the rigid support (30) so the Ski Porter (100) can fold. The ankle (50) is made of plastic and it connects the wheels (40) to the legs (35). The wheels (40) are 7 inches in diameter and 1.5 inches wide with tread suitable for snow packed surfaces and concrete. The ankle (50) is equipped with a hand screw (55) allowing easy removal of the wheels (40).

Figure 2:
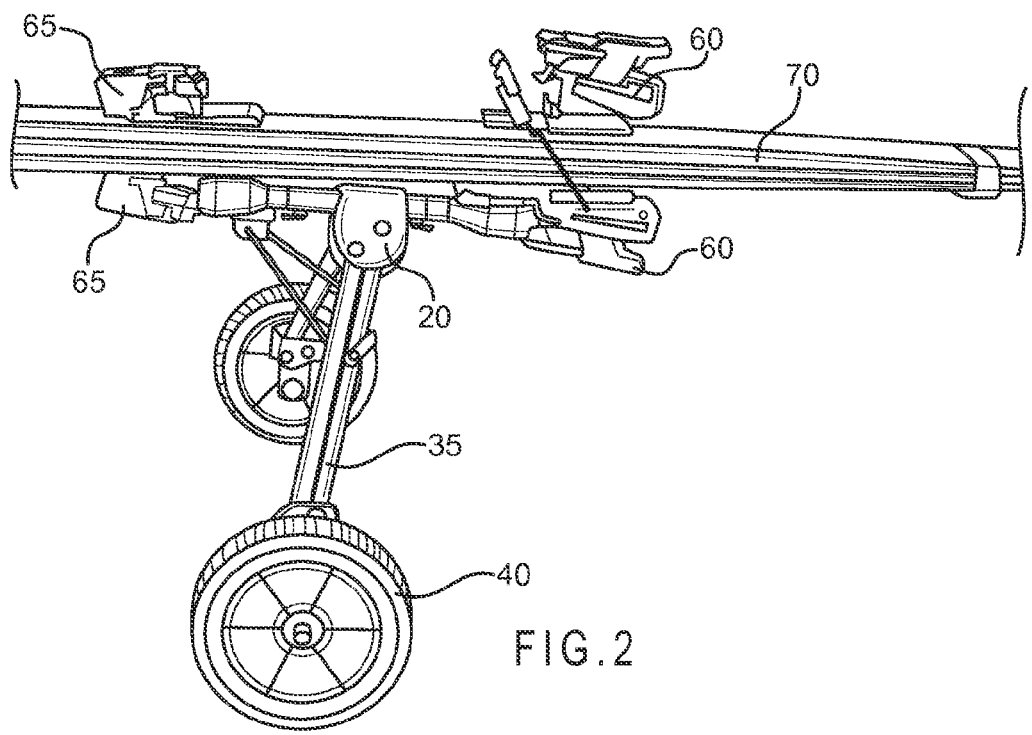
FIG. 2 is a perspective view of a Ski Porter connected to a pair of Alpine skies.

FIG. 2 is an illustration of a Ski Porter (100) mounted to a pair of Alpine skis (70). The binding toe (65) and the binding heel (60) are used to secure the Ski Porter (100) to the skis (70). The Ski Porter (100) is inserted into the boot binding heel and toe (60, 65) in the same fashion as a boot (75).

Figure 3:
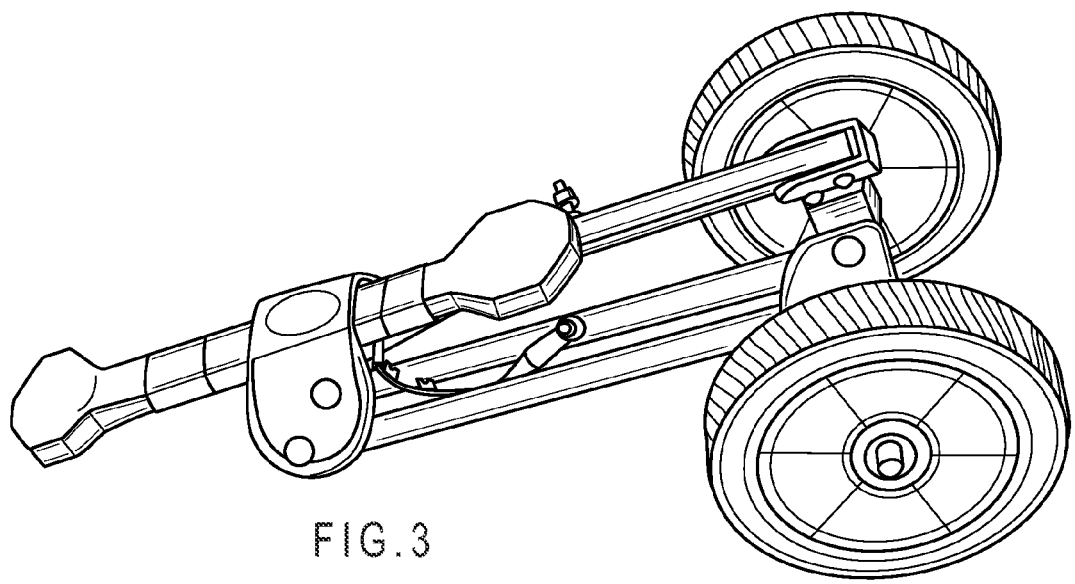
FIG. 3 is a perspective view of a Ski Porter in the folded position.

FIG. 3 is an illustration of a Ski Porter (100) in its folded position with the lever (25) released the Ski Porter (100) folds into a compact configuration small enough for lockers, backpacks and car trucks.

Figure 4:
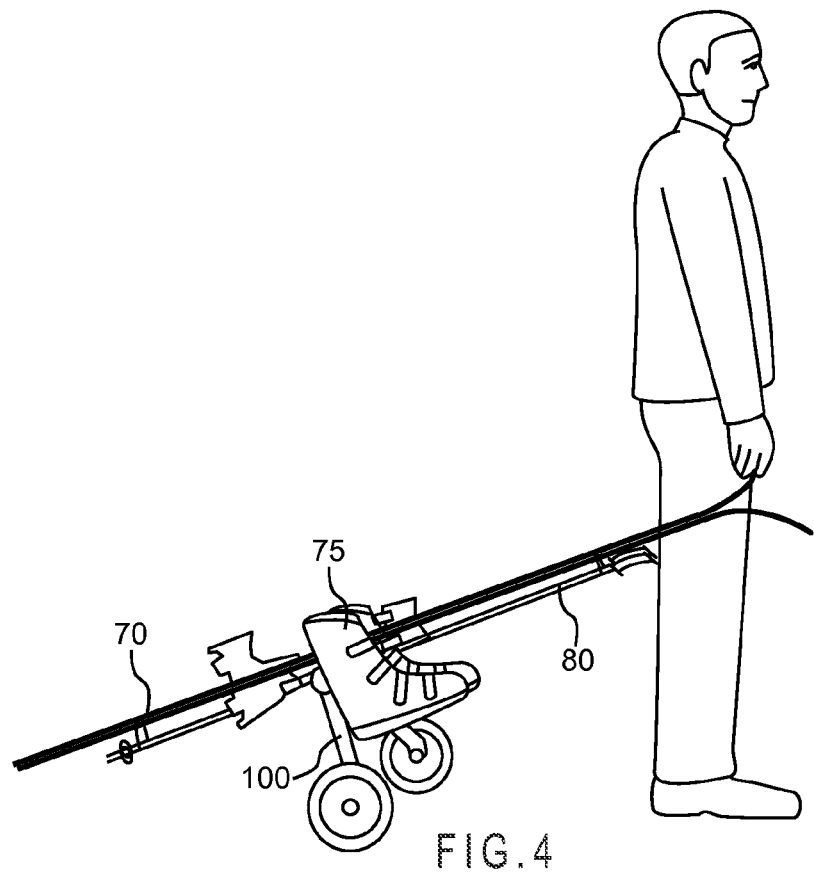
FIG. 4 is a side view of a Ski Porter loaded with skis, boots and poles.

FIG. 4 is an illustration of a Ski Porter (100) loaded with skis (70), boots (75) and poles (80).

I claim:

1. A ski porter comprising:
   an adjustable mount having a toe at a first end and a heel at a second end opposite the first end, the toe having a release lever;
   a first leg;
   a second leg;
   a hingedly movable shoulder connecting the first and second legs to the adjustable mount;
   a first wheel;
   a second wheel;
   a first hingedly movable ankle connecting the first wheel to the first leg;
   a second hingedly movable ankle connecting the second wheel to the second leg;
   a flexible support connecting the first leg to the second leg, the flexible support having one or more tabs configured to hold one or more ski poles;
   a first rigid support; and
   a second rigid support;
   wherein the ski porter is characterized by:
       an expanded condition in which
           the first rigid support connects the first leg to the release lever of the toe; and
           the second rigid support connects the second leg to the release lever of the toe; and
       a compact condition in which
           the release lever is released;
           the first and second rigid supports are disconnected from the release lever and the first and second legs; and
           the ski porter is folded.

2. The ski porter of claim 1, wherein the toe, the heel, the hingedly movable shoulder, and the first and second hingedly movable ankles are made of a plastic material; the first and second legs are made of an aluminum material; and the tabs are made of a molded rubber material.

3. The ski porter of claim 1, wherein the toe is of a ski boot toe shape and the heel is of a ski boot heel shape.

4. The ski porter of claim 1, wherein the first wheel is attached to the first hingedly movable ankle through a hand screw and the second wheel is attached to the second hingedly movable ankle through another hand screw.

5. A method for a user to utilize the ski porter of claim 1 to transport a ski, the method comprising:
   inserting the toe and the heel of the ski porter into a binding toe and a binding heel of the ski.

6. The method of claim 5 further comprising:
   holding a selected ski pole of the one or more ski poles by a selected tab of the one or more tabs of the flexible support.

* * * * *